United States Patent
Zhang et al.

(10) Patent No.: US 8,824,087 B2
(45) Date of Patent: Sep. 2, 2014

(54) ZERO GAIN START BIAS ESTIMATION

(75) Inventors: Haotian Zhang, Longmont, CO (US); Scott Michael Dziak, Fort Collins, CO (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 78 days.

(21) Appl. No.: 13/564,763

(22) Filed: Aug. 2, 2012

(65) Prior Publication Data

US 2014/0036385 A1 Feb. 6, 2014

(51) Int. Cl.
*G11B 5/03* (2006.01)

(52) U.S. Cl.
USPC ............... 360/66; 360/25; 360/31; 360/39; 360/46; 360/65

(58) Field of Classification Search
None
See application file for complete search history.

(56) References Cited

U.S. PATENT DOCUMENTS

| | | | |
|---|---|---|---|
| 6,111,710 A * | 8/2000 | Feyh et al. ................ 360/46 |
| 6,307,696 B1 * | 10/2001 | Bishop et al. ............. 360/51 |
| 7,072,130 B2 * | 7/2006 | Annampedu ............... 360/46 |
| 7,529,320 B2 * | 5/2009 | Byrne et al. .............. 375/326 |
| 8,031,420 B2 * | 10/2011 | Mathew et al. ............ 360/31 |
| 8,199,422 B2 * | 6/2012 | Annampedu et al. ....... 360/39 |
| 8,325,433 B2 * | 12/2012 | Zhang et al. .............. 360/39 |
| 2005/0243455 A1 * | 11/2005 | Annampedu ............... 360/46 |
| 2006/0007571 A1 * | 1/2006 | Pan et al. .................. 360/39 |
| 2012/0026620 A1 | 2/2012 | Annampedu et al. |

* cited by examiner

*Primary Examiner* — Dismery Mercedes
(74) *Attorney, Agent, or Firm* — Suiter Swantz pc llo

(57) ABSTRACT

A method and system for estimating a zero gain start (ZGS) bias in a read channel is disclosed. The method may include: receiving preamble samples within a fixed-length window selected for ZGS calculation; calculating an energy associated with a 2T frequency in the preamble samples; calculating an energy associated with non-2T frequencies in the preamble samples; and calculating the ZGS bias based on the energy associated with the 2T frequency in the preamble samples and the energy associated with non-2T frequencies in the preamble samples.

20 Claims, 1 Drawing Sheet

ZERO GAIN START BIAS ESTIMATION

TECHNICAL FIELD

The present invention relates to the field of data processing and particularly to a method and system for estimating zero gain start (ZGS) bias.

BACKGROUND

A read channel integrated circuit is a component in a hard disk drive. For example, in a magnetic recording system, a read channel converts and encodes data to enable the magnetic recording heads to write data to the disk drive and then read back the data accurately. The disks in a drive have many tracks on them and each track may include user or "read" data sectors as well as control or "servo" data sectors. The information recorded in the servo sectors helps to position the magnetic recording head on track so that the information stored in the read sectors is retrieved properly.

At the beginning of a read or servo event (i.e., when the read or servo sector is being read), the read channel may perform a zero gain start (ZGS) to quickly predict the gain error in the readback signal prior to acquisition of the readback signal's gain and timing. However, current ZGS designs use the zero-forcing (ZF) algorithm in nature. ZF algorithm does not consider noises and therefore performs differently in different noise environment. Therefore, the current ZGS designs have a bias up to several dB when the least mean square (LMS) algorithm is used in gain loop acquisition/tracking. More specifically, at high signal-to-noise ratio (SNR), ZF and LMS have similar performances; however, at a lower SNR, ZF has worse performance than LMS, and the performance difference results in the ZGS bias. Such a bias therefore presents a challenge for using ZGS in real applications.

Therein lies the need to provide a method and system for estimating and mitigating the ZGS bias.

SUMMARY

Accordingly, an embodiment of the present disclosure is directed to a method for estimating a zero gain start (ZGS) bias in a read channel. The method may include: receiving preamble samples within a fixed-length window selected for ZGS calculation; calculating an energy associated with a 2T frequency in the preamble samples; calculating an energy associated with non-2T frequencies in the preamble samples; and calculating the ZGS bias based on the energy associated with the 2T frequency in the preamble samples and the energy associated with non-2T frequencies in the preamble samples.

A further embodiment of the present disclosure is directed to a method for estimating ZGS bias in a read channel. The method may include: receiving preamble samples within a fixed-length window selected for ZGS calculation; filtering a 2T frequency from the preamble samples; calculating an energy associated with non-2T frequencies in the preamble samples ($E_{n2T}$); determining whether $E_{n2T}$ is below a predetermined threshold; setting the ZGS bias to zero when $E_{n2T}$ is below the predetermined threshold; extracting sine and cosine components of the preamble samples; calculating an energy associated with a 2T frequency in the preamble samples ($E_{2T}$); and calculating the ZGS bias based on $E_{n2T}$ and $E_{2T}$ when $E_{n2T}$ is greater than the predetermined threshold.

An additional embodiment of the present disclosure is directed to a ZGS bias estimation system for estimating the ZGS bias in a read channel. The system may include: a sine/cosine demodulator configured for extracting sine and cosine components from preamble samples received within a fixed-length window selected for ZGS calculation; an $E_{2T}$ calculation module configured for calculating an energy associated with a 2T frequency in the preamble samples based on the extracted sine and cosine components; a digital filter configured for filtering a 2T pattern from the preamble samples; an $E_{n2T}$ calculation module configured for calculating an energy associated with non-2T frequencies in the preamble samples based on an output of the digital filter; and a ZGS bias estimation module configured for calculating the ZGS bias based on the energy associated with the 2T frequency in the preamble samples and the energy associated with non-2T frequencies in the preamble samples.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Each read sector and servo sector stored on a hard drive may include a preamble. For example, each sector may begin with the same known preamble pattern. One choice of pattern for the preamble symbols is a 2T pattern, which ensures that the corresponding readback waveform is a sinusoid having an associated 2T frequency. The 2T pattern refers to repetitions of a specific pattern, such as a 1100 . . . pattern, which has a transition of 0 to 1 or 1 to 0 every 2T, where T is the time period allocated for every bit. The read preamble may be followed by a read sync mark and encoded user data. The servo preamble may be followed by a servo address mark and various servo data.

The present disclosure is directed to a method and system for estimating the ZGS bias based on non-2T energy and 2T energy measurement in the preamble. In one exemplary implementation, the preamble of each sector may have a 2T pattern. Energy associated with the 2T frequency, denoted as $E_{2T}$, and energy associated with the non-2T frequencies, denoted as $E_{n2T}$, may be determined. The ZGS bias for each sector may then be estimated based on the values of $E_{2T}$ and $E_{n2T}$. It is contemplated that the method and system in accordance with the present disclosure may be utilizing for a read or servo event. Furthermore, the estimated ZGS bias may be removed from the ZGS value before applying it into the gain loop.

Figure 1:
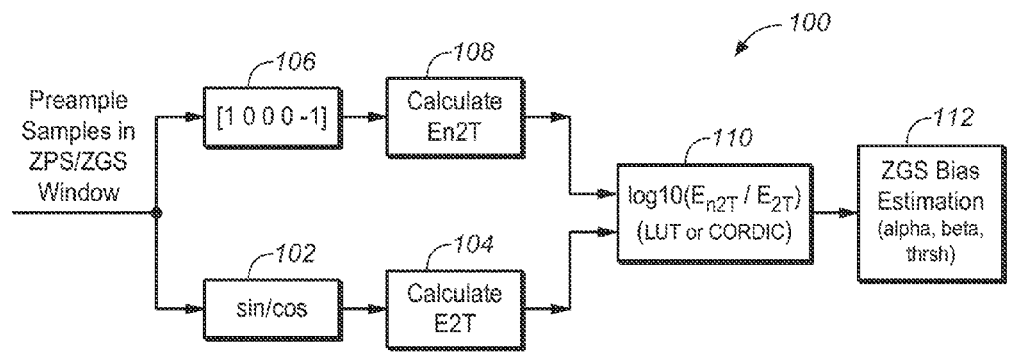
FIG. 1 is a block diagram depicting a system for estimating ZGS bias.

Referring to FIG. 1, a block diagram depicting a system 100 for estimating ZGS bias is shown. As in a conventional system, after the start of read gate, both zero phase start (ZPS) and zero gain start (ZGS) techniques may be utilized to estimate the timing and the gain, respectively. Both ZPS and ZGS may use a fixed number (e.g., 8, 16, 32 or the like) of consecutive preamble samples to perform ZPS/ZGS calculations. In other words, the preamble samples within a fixed-length window may be selected for ZPS/ZGS calculations. Such a fixed-length window may be referred to as a "ZPS window", which may also be used for ZGS.

The preamble samples may be utilized to calculate both the energy associated with the 2T frequency ($E_{2T}$) and the energy associated with the non-2T frequencies ($E_{n2T}$). In one exemplary implementation, a sine/cosine demodulator 102 may be utilized to extract the sine and cosine components of the preamble samples, and an $E_{2T}$ calculation module 104 may calculate the value of $E_{2T}$ according to the equation:

$$E_{2T} = \frac{\text{sum of squares of sine and cosine components within the ZPS window}}{L}$$

Where L is the length of the ZPS window.

The value of $E_{n2T}$ may also be calculated based on the preamble samples. In one exemplary implementation, a digital filter 106 may be utilized to filter the 2T pattern from the preamble samples first. For example, a [1 0 0 0 −1] filter may be utilized to perform such filtering. However, it is contemplated that different filters may also be utilized to filter the 2T pattern from the preamble samples without departing from the spirit and scope of the present disclosure.

An $E_{n2T}$ calculation module 108 may then calculate the value of $E_{n2T}$ based on the output of the digital filter 106. For instance, the value of $E_{n2T}$ may be calculated according to the equation:

$$E_{n2T} = \frac{\text{sum of squares of all samples passing the digital filter}}{L-4}$$

Where L is the length of the ZPS window. That is, $E_{n2T}$ is the value of the sum of squares of all samples within the ZPS window after the digital filter divided by the length of the ZPS window without the boundary samples (i.e., L−4).

The ZGS bias may be calculated now based on the values of $E_{2T}$ and $E_{n2T}$. In one exemplary implementation, ZGS bias may be calculated according to the equation:

$$ZGS \text{ bias} = \log_{10}\left(\frac{E_{n2T}}{E_{2T}}\right) \times \alpha + \beta$$

Where $\alpha$ and $\beta$ are coefficients whose values are programmable and may be determined based on studying and/or machine learning.

More specifically, a calculation module 110 that implements a lookup table (LUT) or a coordinate rotation digital computer (CORDIC) may be utilized to calculate the value of $$\log_{10}\left(\frac{E_{n2T}}{E_{2T}}\right).$$

The output of the calculation module 110 may then be utilized by a ZGS bias estimation module 112 to calculate the ZGS bias according to the equation described above.

Furthermore, as previously mentioned, the values of $\alpha$ and $\beta$ may be determined based on study and/or machine learning. For instance, studies may measure the actual ZGS bias values based on a number of read or sector events performed on a particular read channel. The values of $\alpha$ and $\beta$ may then be determined utilizing various applicable data fitting algorithms. It is contemplated that the values of $\alpha$ and $\beta$ may be predetermined for that particular read channel. Additionally/alternatively, the values of $\alpha$ and $\beta$ may be programmable and modifiable based on a continuous/periodic machine learning process.

It is also contemplated that the calculation of ZGS bias may be conditionally bypassed because the bias may be insignificant under certain conditions. For example, as previously mentioned, ZF and LMS algorithms have similar performances at high SNRs. Therefore, if the value of $E_{n2T}$ is at or below a predetermined threshold (i.e., the energy of the noise is low), the ZGS bias may be set to zero without any further calculations. It is contemplated that the specific value of the threshold may be determined for each particular read channel based on study and/or machine learning.

It is understood that the various modules described above are presented individually in FIG. 1 merely for illustrative purposes. They may be implemented as separate or integrated system components without departing from the spirit and scope of the present disclosure. Furthermore, it is contemplated that the modules described above may be implemented as hardware devices or as computer-executable instructions stored in a computer-readable device (e.g., a memory device). A processor may be utilized to execute such instructions to estimate ZGS bias for a read channel.

Figure 2:
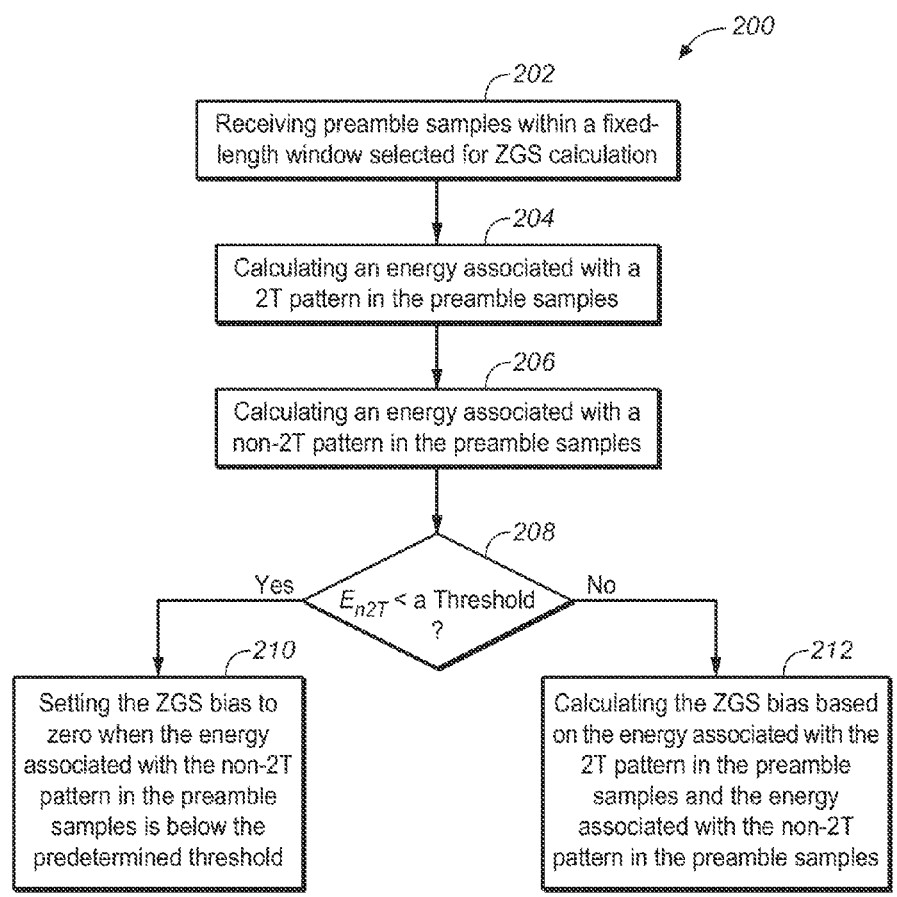
FIG. 2 is a flow diagram illustrating a method for estimating ZGS bias for a read channel in accordance with the present disclosure.

Referring to FIG. 2, a flow diagram illustrating a method 200 for estimating ZGS bias for a read channel is shown. Upon receiving preamble samples within a fixed-length window selected for ZGS calculation in step 202, step 204 may calculate the energy associated with the 2T frequency in the preamble samples and step 206 may calculate the energy associated with non-2T frequencies in the preamble samples. It is contemplated that steps 204 and 206 may be performed concurrently or sequentially (in any order).

In one embodiment, step 208 may determine whether the energy associated with non-2T frequencies in the preamble samples is below a predetermined threshold. Step 210 may set the ZGS bias to zero if the energy associated with non-2T frequencies in the preamble samples is below the predetermined threshold. Otherwise, step 212 may calculate the ZGS bias based on the energy associated with the 2T frequency in the preamble samples and the energy associated with the non-2T frequencies in the preamble samples as described above. It is contemplated that the estimated ZGS bias may then be removed from the ZGS value (to improve its accuracy) before applying it into the gain loop.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for estimating a zero gain start bias in a read channel, the method comprising:
   receiving preamble samples within a fixed-length window selected for zero gain start calculation;
   calculating an energy associated with non-2T frequencies in the preamble samples;
   determining whether the energy associated with non-2T frequencies in the preamble samples is below a predetermined threshold;
   setting the zero gain start bias to zero when the energy associated with non-2T frequencies in the preamble samples is below the predetermined threshold;
   calculating an energy associated with a 2T frequency in the preamble samples when the energy associated with non-2T frequencies in the preamble samples is above the predetermined threshold; and
   calculating the zero gain start bias based on the energy associated with the 2T frequency in the preamble samples and the energy associated with non-2T frequencies in the preamble samples when the energy associated with non-2T frequencies in the preamble samples is above the predetermined threshold.

2. The method of claim 1, wherein calculating an energy associated with a 2T frequency in the preamble samples further comprising:
   extracting sine and cosine components of the preamble samples; and
   calculating the energy associated with the 2T frequency in the preamble samples according to equation:

$$E_{2T} = \frac{\text{sum of squares of sine and cosine components within the fixed-length window}}{L}$$

wherein L is the length the fixed-length window.

3. The method of claim 1, wherein calculating an energy associated with non-2T frequencies in the preamble samples further comprising:
   filtering the 2T pattern from the preamble samples; and
   calculating the energy associated with non-2T frequencies in the preamble samples according to equation:

$$E_{n2T} = \frac{\text{sum of squares of all samples passing the digital filter}}{L-4}$$

wherein L is the length the fixed-length window.

4. The method of claim 3, wherein the preamble samples are filtered utilizing a [1 0 0 0 −1] digital filter.

5. The method of claim 1, wherein the zero gain start bias is calculated according to equation:

$$ZGS \text{ bias} = \log_{10}\left(\frac{E_{n2T}}{E_{2T}}\right) \times \alpha + \beta$$

wherein $\alpha$ and $\beta$ are programmable coefficients.

6. The method of claim 5, wherein values of $\alpha$ and $\beta$ are determined based on data fitting to a plurality of actual zero gain start bias values measured for the read channel.

7. The method of claim 1, wherein the read channel is a component in a hard disk drive.

8. A method for estimating a zero gain start bias in a read channel, the method comprising:
   receiving preamble samples within a fixed-length window selected for zero gain start calculation;
   filtering a 2T frequency from the preamble samples;
   calculating an energy associated with non-2T frequencies in the preamble samples according to equation:

$$E_{n2T} = \frac{\text{sum of squares of all samples passing the digital filter}}{L-4}$$

wherein L is the length the fixed-length window;
   determining whether $E_{n2T}$ is below a predetermined threshold;
   setting the zero gain start bias to zero when $E_{n2T}$ below the predetermined threshold;
   extracting sine and cosine components of the preamble samples;
   calculating an energy associated with a 2T frequency in the preamble samples according to equation:

$$E_{2T} = \frac{\text{sum of squares of sine and cosine components within the fixed-length window}}{L}$$

wherein L is the length the fixed-length; and
   calculating the zero gain start bias based on $E_{n2T}$ and $E_{2T}$ when $E_{n2T}$ is greater than the predetermined threshold.

9. The method of claim 8, wherein the preamble samples are filtered utilizing a [1 0 0 0 −1] digital filter.

10. The method of claim 8, wherein the zero gain start ZGS bias is calculated according to equation:

$$ZGS \text{ bias} = \log_{10}\left(\frac{E_{n2T}}{E_{2T}}\right) \times \alpha + \beta$$

wherein $\alpha$ and $\beta$ are programmable coefficients.

11. The method of claim 10, wherein values of $\alpha$ and $\alpha$ are determined based on data fitting to a plurality of actual zero gain start bias values measured for the read channel.

12. The method of claim 8, further comprising:
removing the estimated zero gain start bias from a zero gain start calculation.

13. A zero gain start bias estimation system for estimating the zero gain start bias in a read channel, the system comprising:
- a digital filter configured for filtering a 2T pattern from preamble samples received within a fixed-length window selected for zero gain start calculation;
- an $E_{n2T}$ calculation module configured for calculating an energy associated with non-2T frequencies in the preamble samples based on an output of the digital filter;
- a determination module configured for determining whether the energy associated with non-2T frequencies in the preamble samples is below a predetermined threshold and setting the zero gain start bias to zero when the energy associated with non-2T frequencies in the preamble samples is below the predetermined threshold;
- a sine/cosine demodulator configured for extracting sine and cosine components from the preamble samples when the energy associated with non-2T frequencies in the preamble samples is above the predetermined threshold;
- an $E_{2T}$ calculation module configured for calculating an energy associated with a 2T frequency in the preamble samples based on the extracted sine and cosine components when the energy associated with non-2T frequencies in the preamble samples is above the predetermined threshold; and
- a zero gain start bias estimation module configured for calculating the zero gain start bias based on the energy associated with the 2T frequency in the preamble samples and the energy associated with non-2T frequencies in the preamble samples when the energy associated with non-2T frequencies in the preamble samples is above the predetermined threshold.

14. The system of claim 13, wherein $E_{2T}$ is calculated according to equation:

$$E_{2T} = \frac{\text{sum of squares of sine and cosine components within the fixed-length window}}{L}$$

wherein L is the length the fixed-length window.

15. The system of claim 13, wherein $E_{n2T}$ is calculated according to equation:

$$E_{n2T} = \frac{\text{sum of squares of all samples passing the digital filter}}{L-4}$$

wherein L is the length the fixed-length window.

16. The system of claim 13, wherein the digital filter is a [1 0 0 0 −1] digital filter.

17. The system of claim 13, wherein the zero gain start bias is calculated according to equation:

$$ZGS\ \text{bias} = \log_{10}\left(\frac{E_{n2T}}{E_{2T}}\right) \times \alpha + \beta$$

wherein $\alpha$ and $\beta$ are programmable coefficients.

18. The system of claim 17, wherein $$\log_{10}\left(\frac{E_{n2T}}{E_{2T}}\right)$$

is calculated utilizing at least one of: a lookup table, or a coordinate rotation digital computer.

19. The system of claim 17, wherein values of $\alpha$ and $\beta$ are determined based on data fitting to a plurality of actual zero gain start bias values measured for the read channel.

20. The system of claim 13, wherein the zero gain start bias estimation system is fabricated as a component of the read channel integrated circuit in a hard disk drive.

* * * * *